Patented June 28, 1932

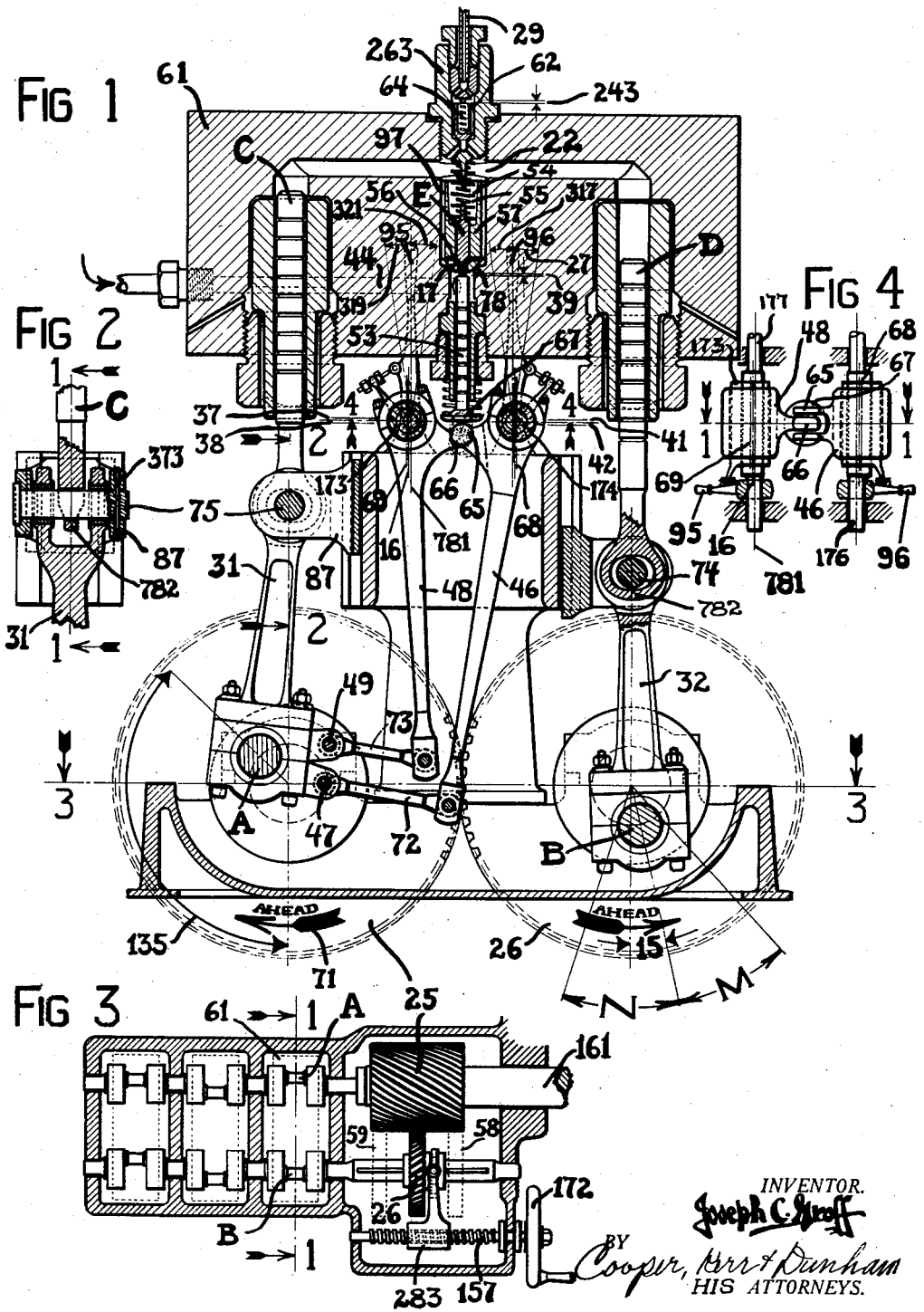

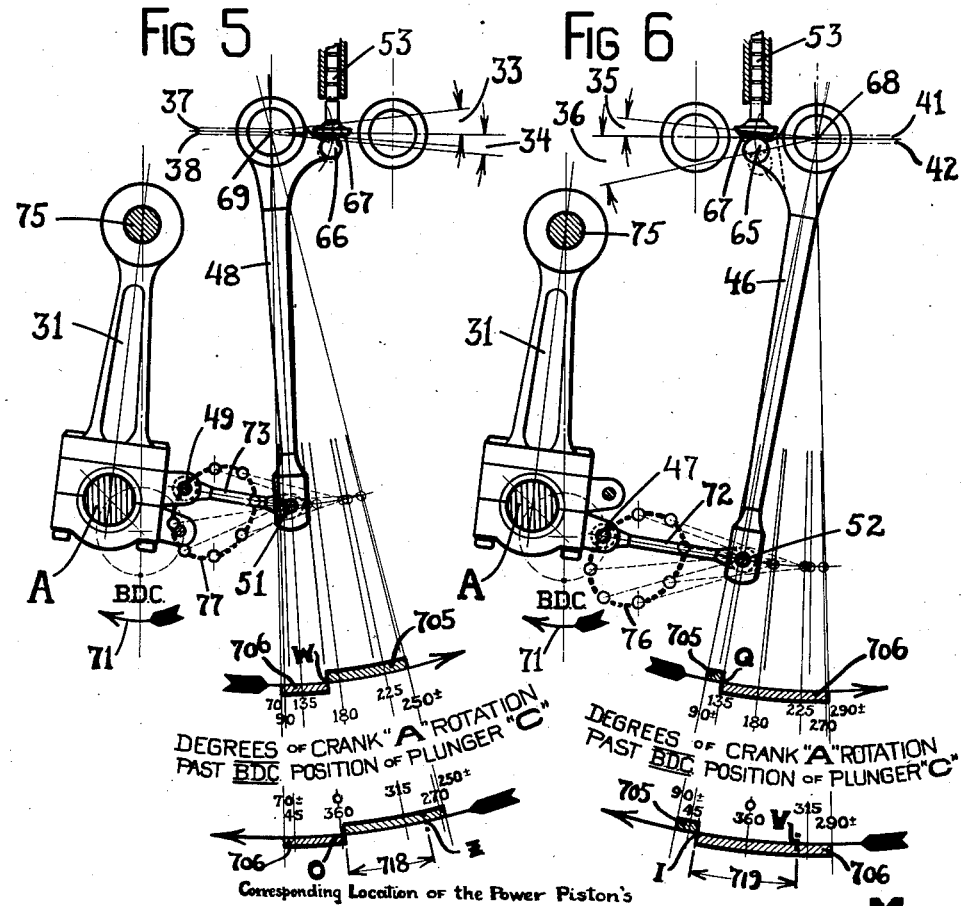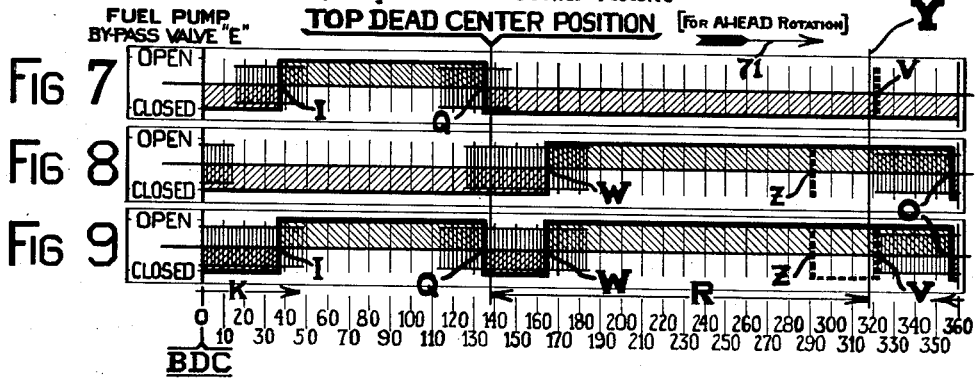

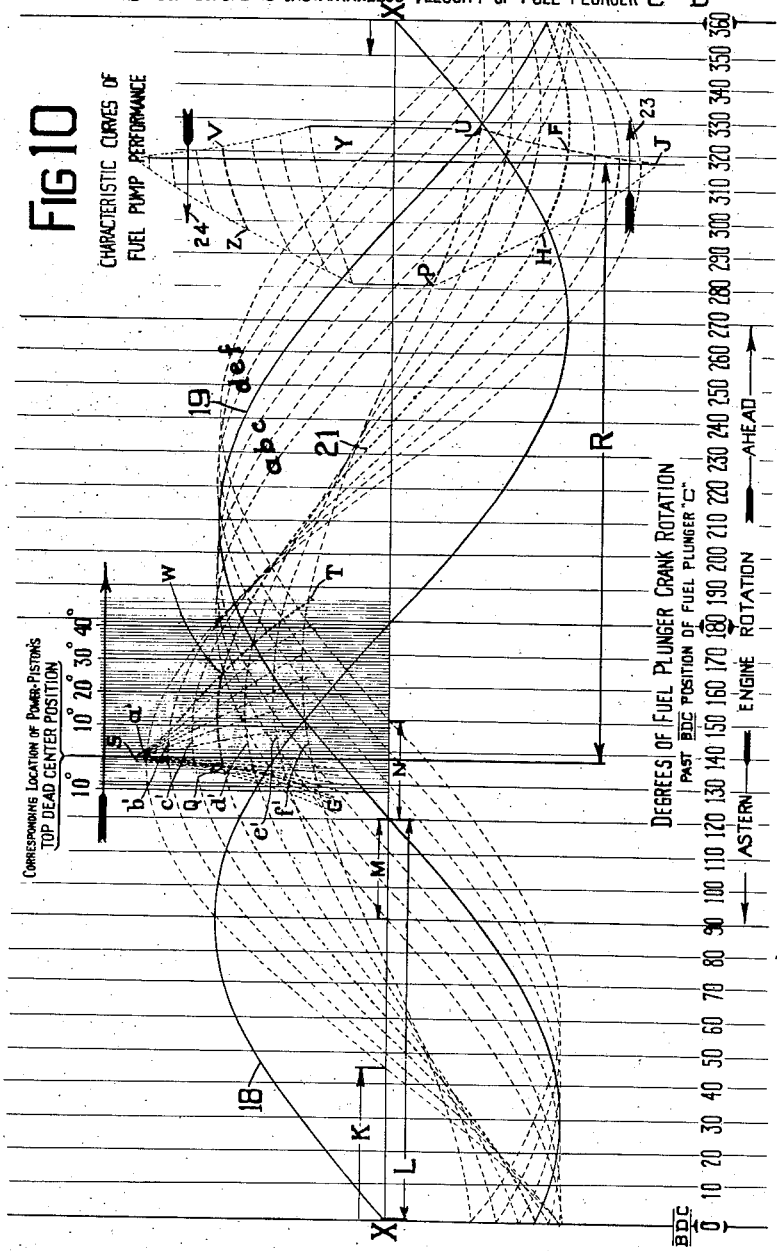

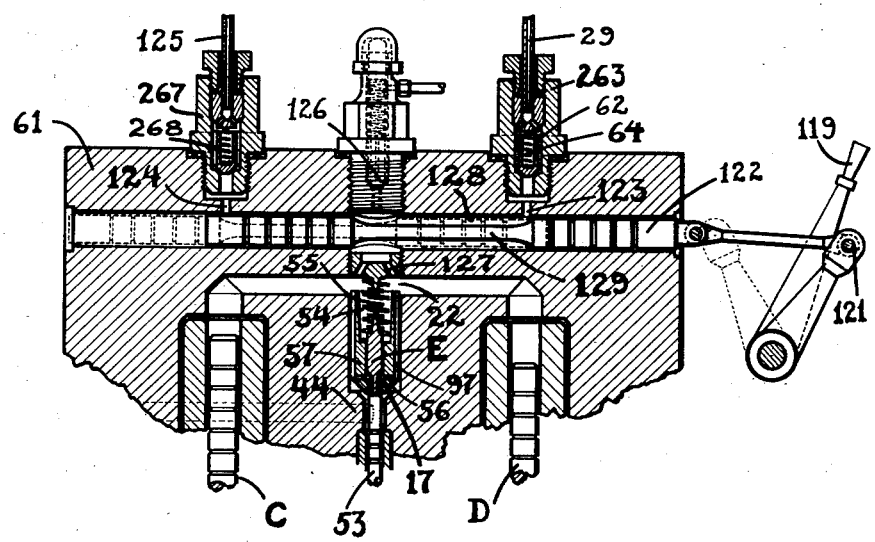
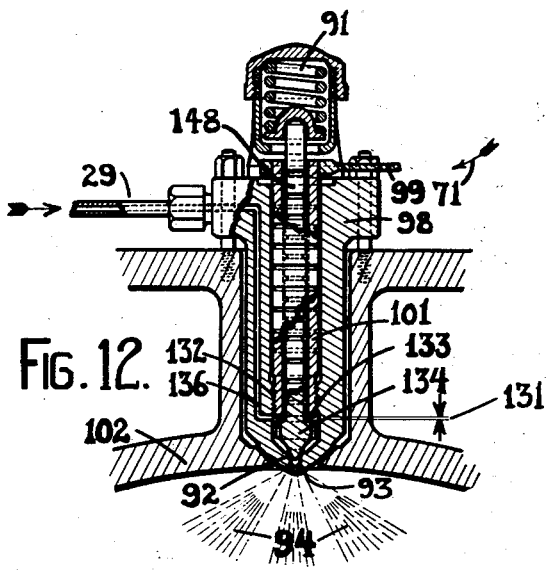

1,865,099

UNITED STATES PATENT OFFICE

JOSEPH C. GROFF, OF NEW YORK, N. Y.

AIRLESS FUEL SUPPLYING AND INJECTING SYSTEM FOR DIESEL AND OTHER LIKE FORMS OF COMPRESSION IGNITION INTERNAL COMBUSTION ENGINES

Application filed March 26, 1927. Serial No. 178,537.

The present invention relates to internal combustion engines of the Diesel type and more particularly to certain improvements in the fuel supplying and injecting systems for these and other like forms of compression ignition engines which employ airless or, so-called, "solid" fuel injection.

It should be understood that the terms "solid-injection", "mechanical-injection" and "airless-injection" as commonly accepted and as used in this specification are synonomous in referring to the process of injecting a measured charge of liquid fuel substance into the combustion chamber proper—or into regions valvelessly adjacent thereto—of an internal combustion engine operating on the Diesel cycle, by subjecting such charge of liquid to considerable pressure and forcing it through small orifices or holes—commonly known as "spray nozzles"—at relatively high velocity.

This action has the effect of forcing directed "sprays" or "jets" of said liquid combustible into the charge of previously compressed and thereby sufficiently heated air within the combustion chamber. The resistance offered by said compressed and therefore relatively dense air tends to retard these jets moving therethrough with high velocity and to disperse them into numerous small particles of liquid fuel, each moving with gradually diminishing velocity.

Such movement by said particles, through the relatively dense heated air, affords increased opportunity for and greatly assists the necessary transfer of heat from the hot air to the relatively cooler fuel particles, which must thus receive igniting heat before combustion can take place. This action is largely due to the fact that said frictional resistance offered by the dense air tends to "peel" off the then outer and relatively heated surface layer of each particle as it traverses the air into various regions of the combustion chamber. Such action promotes not only heat transfer but also more complete combustion beucause the then relatively cooler underlying layers of said liquid particles are successively exposed in and to previously uncontaminated regions of hot air.

Such action also greatly assists to insure more complete atomization of the entire particle since said "peeling effect" decreases the size of the particle more rapidly than would otherwise result, which tends to counteract the gradual tapering off of its kinetic energy to better maintain its direction of movement further into the dense air. That is to say, the period of its movement through the heated air, and of enhancement of atomization thereby, is lengthened before it either comes to rest or is completely burned.

Briefly, the function of any airless fuel injection system, taken in its entirety, resolves itself primarily into the following: first, the supplying of correctly timed, optionally variable though accurately measured charges of liquid fuel into the power cylinder combustion spaces; and secondly, the injection of the particles thereof with such atomizing and penetrative spray nozzle velocity, and, considering the whole charge and the distribution of the same, at such a rate that said fuel may be in thorough combustible association with the compressed charge of heated air to subsequently burn with a high degree of efficiency but without excessive sudden increase of pressure within the cylinder.

It should be understood that attainment of ideal combustion efficiency with airless injection is largely, if not entirely, dependent upon properly establishing and coordinating three of the aforementioned factors, which in turn are largely determined by the characteristics of the "jets" of fuel so injected. The first of these factors, and probably the most important, is commonly referred to as "atomization" and involves the means whereby the injected fuel is brought into intimate contact with the air for its combustion. Generally speaking, atomization may be enhanced either by increasing the velocity of the fuel as ejected from the spray nozzle, or by diminishing the size of the spray nozzle (velocity remaining unchanged), or by any suitable combination of the two and vice versa.

A second important factor is "penetration" by which is meant, the ability of the fuel particles to traverse the dense and heated air to points therein which are more or less remote from the point of their ejection from the spray nozzle. Decreasing the velocity of injection has the effect of increasing the penetrative ability of a spray jet since the previously mentioned "peeling effect"—which is largely dependent upon the velocity of the fuel particles and increase of which tends to hasten atomization to a considerable extent—is thereby lessened to delay completion of atomization of the particle sufficiently to permit it to traverse the dense air for a greater distance before being completely burned, and vice versa. A similar effect is caused by enlarging the diameter of the spray nozzle (nozzle velocity remaining unchanged) since the time elapsing between ejection of the spray jets from the nozzles and breaking up or dispersion of said jets into the previously mentioned particles, and therefore the penetrating power of such jets, increases up to certain limits with increase in size of the nozzle, and vice versa.

The remaining factor in this group is that of "distribution" by which is commonly meant, the thoroughness and uniformity with which the injected fuel is spread or distributed throughout the previously compressed charge of air within the combustion chamber. Insofar as distribution is largely dependent upon the penetrative qualities of given fuel jets, which in turn are largely determined by the relative extent of their atomizing ability as previously mentioned, it will be seen that distribution itself is also largely dependent (for any given arrangement of injecting valve and combustion chamber, number and size of spray nozzles, and for any given compression ratio, operating speed and grade of fuel) upon the magnitude of the velocity of fuel passage through the spray nozzles.

It should be understood therefore that one of, if not, the most important objective to achieve in the design of an airless fuel injection system should be that of providing means to vary or adjust the velocity of fuel passage through the spray nozzles. This is necessary, particularly for large unit engines, in order to accommodate engine operation to such undesirable factors as are introduced by changes in engine speed, variation in the physical or chemical characteristics of the fuel, variations in compression, etc.

It should also be understood that a matter of equal importance with ability to vary the rate of injection, is the ability to maintain any such rate of injection over the entire period of such injection. That is to say, the rate of injection should not fluctuate (i. e. rise or fall) to any very great extent, but should be uniformly maintained between the instants of commencement and termination thereof.

Obviously, to be commercially feasible, any fuel supplying system, whether employing compressed air or mechanical means to effect injection, must justify its cost of construction and of maintenance by achieving a commensurate degree of service reliability and of combustion efficiency.

Present forms of airless fuel injection systems either accept comparatively inefficient, unreliable, or otherwise objectionable operating performance in order to simplify and lower the cost of the engine and of the fuel injecting mechanism as far as permissible, or else, resort to objectionably complicated and more costly devices to achieve a higher degree of combustion efficiency.

The principal object of the present invention resides in the provision of means whereby a high degree of reliable combustion efficiency may be achieved with airless injection of liquid fuel substances in conjunction with and by means of injecting mechanism of relatively simple and non-costly construction, as compared with previous forms of injection systems.

While relating to all of the various types or classes of compression ignition engines, special emphasis is placed upon attainment of the foregoing objectives under the most difficult and adverse commercial operating conditions which such engines have to adapt themselves to. Particular reference is made to direct connected marine engines and other forms of automotive engines whose field of utility depends largely upon their ability to operate through wide ranges of speed and of power output. And, this must be done with reliable efficiency regardless of the usual wide variation of commercial grades of liquid fuels, particularly the cheaper ones.

It has not been altogether possible to achieve such an ideal with injecting devices heretofore in use without involving features which, if not basicly limitative, were sufficiently objectionable to be commercially unsuccessful. For example, with such previous devices and particularly those aiming to embody simplicity in their construction, extreme difficulty has been experienced in starting such engines either from cold or otherwise. It has been necessary to resort to such compromise aids as pre-heated incandescent surfaces or "hot-spots", incandescent fuses, electrical igniting plugs, or starting fuel having considerable lower ignition point, etc.

It should be understood that, while fuel supply systems which employ such uncertain injection and combustion regulating devices as hot-bulbs, retort-tubes, pre-combustion chambers, etc., and which are mostly used in conjunction with medium sized engines operating under favorable conditions incident to operation at one set high speed, due to the simplicity of injecting mechanism which can thus be utilized, can achieve a fair degree of combustion efficiency with a given grade of fuel at some such definite set speed and load rating, they are not adapted to efficient operation upon varying grades of fuel, or over a wide range of speeds. Neither can they achieve a constructionally economical full-load rating nor a commercially desirable overload rating with any degree of combustion efficiency or of reliable performance.

The objectional limitations inherent to such previous injecting devices lies in the fact that too many of the governing factors associated with and largely determining attainment of desirably efficient fuel injection and combustion are not subject to independent and variable control or adjustment. Being tied to certain adjustments, the performance of previous devices for varying operating conditions can only at best be a compromise which best satisfies all of the various and ramified requirements peculiar to their entire range of operations. Such devices can not achieve the utmost efficiency for any one or all of a number of different conditions but at best can only have a compromise efficiency, which for conditions of performance is necessarily very low.

From the foregoing, it should be understood that, in solid injection practice, numerous factors have to be considered. These factors interact with each other and such interaction has brought about the difficulties heretofore encountered. Difficulty in starting up from cold and in operating over a wide range of speeds is chief among such considerations. Such engines are started by being turned over with compressed air and such starting speed is usually considerably less than slow or normal operating speeds. With usual fuel pump construction, the rate of fuel displacement or of delivery varies directly with the engine speed and accordingly the spray nozzle velocity is relatively much lower for starting conditions than for slow or normal running speeds. Also, the spray nozzle velocity for slow or normal running speeds is relatively less than it is for full running speed. However, the spray nozzle velocity must be sufficiently great to insure adequate atomization of the fuel when starting under cold adverse conditions. But, if such velocity is great enough for starting speeds, the nozzle velocity and atomization will be excessive at running speeds.

According to the present invention, means are provided whereby the charge of liquid fuel to be burnt may be injected directly into the compressed and heated air within the combustion chamber proper, without employing the complicated and otherwise objectionable mechanism involved with existing direct injection systems.

A further object of the present invention resides in the provision of means whereby compression ignition engines employing such direct airless fuel injection may be either initially or intermittently started with reliable positiveness without resorting to the objectionable preliminary procedure heretofore involved.

A further object of the present invention resides in the provision of fuel supplying and injecting means whereby each of such particular factors as, timing of injection commencement, velocity of fuel passage through the spray nozzles, rate of fuel injection, timing of injection termination or cut-off, together with the quantity of fuel injected, may be subject to desirable individual or respectively independent adjustment under simple positive control without employing such complicated mechanism as camshaft regulated fuel injection valves remotely (from pump) located on each respective power cylinder, or the like.

According to the present invention, independent adjustment of the foregoing factors may be achieved by the fuel injecting pump means itself without the use of supplementary fuel valve controls which heretofore functioned separately from the fuel pumping means to provide such regulating adjustments.

Other and more detailed objects and advantages of the present invention will be hereinafter pointed out in the accompanying specification and claim, and shown in the drawings which by way of illustration, show what I now consider preferred embodiments of my invention.

In the drawings:

Fig. 1 is a transverse sectional view which illustrates diagrammatically a preferred embodiment of my invention, particularly for large unit slow speed direct reversible engines. It is taken substantially on line 1—1 in Fig. 3, and shows the substantial arrangement of the parts just prior to the instant of commencement of fuel injection.

Fig. 2 is a detailed sectional view taken substantially on line 2—2 in Fig. 1.

Fig. 3 is a horizontal longitudinal sectional view (in reduced scale) of the device shown in Fig. 1 with certain parts omitted and further illustrates the arrangement of my fuel injecting pump and of its driving and adjusting means. The relative relation of certain parts above the section 3—3 of Fig. 1 are indicated in dotted outlines for clearer illustration.

Fig. 4 is a detailed perspective view of the injection regulating device shown in Fig. 1 and is taken substantially on line 4—4 in Fig. 1 facing in the direction of the arrows.

Figs. 5 and 6 are skeleton diagrams of certain of the injection regulating parts shown in Fig. 1 and respectively illustrate their relative positions and valving actions for various different crank positions.

Figs. 7 and 8 show the respective radial valve diagrams indicated in Figs. 6 and 5 in the form of equivalent developments plotted to rectangular co-ordinates.

Fig. 9 illustrates the combined or actual resultant valving action as derived from the valve diagrams shown in Figs. 7 and 8.

Fig. 10 shows diagrammatically certain illustrative characteristic curves of a fuel injecting pump embodying the novel features of my present invention.

Fig. 11 shows a lateral sectional view of another embodiment of my invention which is more readily adapted to direct reversible engines of certain classes than the embodiment illustrated in Fig. 1.

Fig. 12 shows a longitudinal sectional view in the region of and through portions of the cylinder head of an internal combustion engine and illustrates in diagrammatic form substantially the arrangement of a preferred embodiment of my automatic fuel injecting valve.

Referring now to Figs. 1 and 3 it will be seen that my novel fuel supplying means comprises a plurality of plungers C and D, preferably two for simplicity of construction. As shown, the plungers are separately actuated by suitable operating connections, such as cranks or the like, each from one of a pair of shafts respectively designated by A and B. One of these shafts such as A is driven with always fixed and unchangeable timed relation with and by the engine, either through suitable gearing from the engine crankshaft (not shown in the drawings), or preferably, directly from and by an extension 161 of either the engine crankshaft or camshaft depending upon the class of engine. The other shaft B is driven from the first mentioned shaft A as shown, or else by any other suitable intermediate driving means which will permit a change to be made in the angular relations of shafts A and B.

Preferably change in the angular relations between shafts A and B is accomplished by providing two helical gears 25 and 26, the former fixed to crankshaft A—161 and constituting the driving gear, and the latter 26, constituting the driven gear, being slidably disposed by keying same to an extended part of shaft B, or vice versa.

To effect angular adjustment or variation of the angular relation existing between shafts A and B the gear 26 is slid along its shaft B into various positions by manipulating a suitable shifting arm 283 either by the worm 157 and manually operated handwheel 172 or by any suitable hydraulic, pneumatic or electrical shifting devices not shown in the drawings.

Hereinafter in the specification, and as shown in the drawings, the arrangement of my fuel supplying and injecting system is assumed to apply to engines which operate on the two-stroke cycle in order to more simply and clearly describe the features and operation of my invention. However, it should be understood that my novel fuel injecting means can be equally well adapted to engines operating on the four-stroke cycle.

The use of the aforesaid multiple drive plunger pumping means for varying or adjusting the rate of fuel delivery to the spray nozzle or nozzles of a fuel injecting valve will now be described. Refer now to Fig. 10 which diagrammatically illustrates the performance characteristics of a specific arrangement of various factors embodied in my invention and substantially such as shown in Figs. 1, 3 and 11.

On the diagram in Fig. 10 the individual and therefore resultant characteristic curves of the two plungers C and D are plotted on the following assumptions: that the connecting rods 31 and 32 in Figs. 1, 5 and 6 are of infinite length; that cranks A and B have the same throw; and that the plungers C and D have the same diameter. These curves would therefore be slightly modified in practice by the influence of connecting rod angularity. It should be understood that other, and in certain cases, more desirable characteristics than those shown in Fig. 10 may be secured by: making the diameter of plunger C smaller than the diameter of plunger D, or vice versa; making the stroke of plunger C smaller than the stroke of plunger D, or vice versa; making shaft B rotate slower or faster than shaft A; or gearing the pumpshaft 161 to drive the pump slower or faster (in some multiple ratio) than the engine crankshaft.

Thus, curve 18 represents the varying velocity of delivery and eduction of fuel by one and the unchangeably acting plunger C acting alone. Due to the harmonic characteristics of the crank A, delivery commences slowly with the crank on its bottom dead center position, indicated by B. D. C. in Figs. 5, 6, 7, 8, 9 and 11; approaches a maximum upon the half stroke; and then slows down until the top dead center is reached, when it ceases altogether. The educting action occurring during the return or down stroke of plunger C takes place with varying velocity thereof in a substantially similar manner.

Upon the diagram in Fig. 10, ordinates extending from and above the normal line X—X represent respective relative rates of fuel displacement and of injection. Ordinates extending from and below X—X represent respective relative rates of eduction or sucking in of the fuel to the pump from the fuel source.

Curve 19 represents the displacement and eduction of fuel which would be caused by plunger D which is operated by the angularly changeable (with respect to crank A)

crank B, if it were acting alone. Curve 21 represents the resultant or combined displacing and educting action of plungers C and D acting together in unison and as shown by curves 18 and 19 respectively. That is to say, respective ordinates of curve 21 are equivalent to the vector sums of the corresponding respective ordinates of curves 18 and 19.

As designated by L in Fig. 10, and as shown by curves 18, 19 and 21 in heavy line, plungers C and D are out of phase by an angular interval shown as being equivalent to 120-crank degrees. In other words, crank A in Fig. 1 reaches its top dead center position 120-crank degrees before crank B reaches its top dead center position; and also, the difference between the angles designated by arcs 135 and 15 is 120-degrees for this particular condition.

By way of example, suppose that the slidable helical gear 26 occupies the central position shown in Fig. 3 to cause plungers C and D, then correspondingly out of phase by 120-degrees to act and interact according to curves 18, 19 and 21 as previously described. Then, it will be noted, the rate of fuel delivery in way of Q—W on curve 21, which results from such interaction of plungers C and D, is progressively increased by lessening the angular phase difference L. This increase in rate of injection is indicated by the corresponding parts $c'$, $b'$ and $a'$ of the respective curves of resultant interaction $21c'$, $21b'$ and $21a'$, which show the increased rate of fuel delivery produced therebetween by successive decreases of 10-crank degrees each in said phase difference L.

Thus, part $a'$ of curve $21a'$ indicates a desired maximum rate of fuel injection which is secured by decreasing the phase difference L by a maximum angular amount M which is shown as being equivalent to 30-crank degrees. Such decrease in phase difference is accomplished by moving the helical gear 26 from the central position shown in Fig. 3 to the dotted line position 58.

In like manner, a desired minimum rate of fuel injection indicated by part $f'$ of curve $21f'$ is secured by moving gear 26 from its central position to the dotted line position 59 in Fig. 3 which increases the phase difference L by a maximum angular amount N also shown as being equivalent to 30-crank degrees. The arcs M and N in Figs. 1 and 10 indicate the magnitude and direction of such maximum changes in the phase difference L.

Accordingly, the parts $a'$, $b'$, $c'$, Q—W, $d'$, $e'$ and $f'$ of the respective curves $21a'$, $21b'$, $21c'$, 21, etc., indicate the interacting or resultant relative rates of fuel delivery from a common pump passage 22 to a common (to plungers C and D) delivery pipe 29 leading to the injecting valve (see Fig. 12) 134, which are secured by the respective interacting effects of each of a series of variable effects shown by curves $19a$, $19b$, $19c$, $19d$, etc., with unchangeable effects shown by curve 18, as caused by plungers D and C respectively.

As will be hereinafter explained, only a part of the delivering period of said interacting pumping means is utilized to effect injection of the fuel. On the diagram in Fig. 10, this part is indicated by Q—W for curve 21. That is to say, delivery of fuel by the pump to the spray nozzles from whence it is injected into the power cylinder combustion spaces, commences at Q (shown as being 3-crank degrees prior to completion of the power pistons compression stroke) and extends over to the point of cut-off or of injection termination W (shown as being 26-crank degrees past the power piston's top dead center position). Thus, for this particular illustrative example, the part Q—W of curve 21 designates a fuel injection period extending over 29-crank degrees of engine rotation. Similarly, the part $f'$ or G—T of curve $21f'$ designates a fuel injection period extending from G (10-degrees prior to T. D. C. of power piston) to T (47½-degrees past T. D. C. of power piston), or, over a period of 57½-crank degrees. In this latter case however, it should be noted that the rate of injection for the period G—T is considerably less, in fact, less than half of the rate of injection for the period Q—W.

It should be noted that in both of the just mentioned cases the fuel is supplied to the spray nozzles at almost uniform velocity over the entire range of each injection period Q—W and G—T, since both Q—W and G—T closely approximate a horizontal straight line. This latter characteristic of uniformly sustained injecting velocity is extremely desirable and important, since excessive fluctuation of such velocity, such as accompanies the harmonic motion effects of a constantly acting single plunger pump as heretofore used, causes objectionable variation in the efficiency of fuel injection and of combustion.

Furthermore, all of the parts $a'$, $b'$, $c'$, etc., included between lines SQG and SWT, of the respective curves $21a'$, $21b'$, $21c'$, etc., do likewise closely approximate horizontal straight lines. Thus, while the relative rate of fuel delivery may be varied to secure almost any desirable rate of injection by means of my novel fuel supplying system, any such rate of injection is substantially constant or uniform.

As will be hereinafter explained, the respective instants of injection commencement Q (on curve 21) and of injection termination W (also on curve 21 in Fig. 10) may be varied or adjusted to any other desired instant. It should be noted that the series of dotted curves $21a'$, $21b'$, $21c'$, 21, etc., denoting respectively different relative rates of injection are all intersected by two other series of curves, namely: by the series of dotted curves SQG which indicate variable timing of injection commencement; and by the series of dotted curves SWT which denote variable instants of injection termination.

Thus, with my novel fuel supplying construction any desirable combination of the elements of timing of injection commencement, of timing of injection termination, and of the rate of injection or of spray nozzle velocity may be secured. Furthermore, any one or more of such respective elements may be varied or adjusted independently or without affecting the remaining factors.

The following general conditions of operation of my novel fuel supplying means as illustrated in Fig. 10 should be noted in order that their interrelated actions for different conditions may be clearly understood:

First, with any one fixed angular adjustment of the shafts A and B of my novel pumping device to secure some desirable rate of injection at some set engine speed, such rate of injection is varied directly by subsequent change in speed, (i. e. subsequent increase in engine speed increases such rate of injection for any one unchanged angular adjustment and vice versa).

Secondly, in Fig. 10 the curves $21a'$, $21b'$, etc., show different "velocity factors," or, relative rates of fuel delivery for corresponding angular adjustments of shafts A and B in a relative manner only, and independently of the speed of engine rotation. That is to say, such respective curves do not show absolute rates of fuel delivery since the absolute rate of delivery is not simply dependent upon the velocity factor but also is dependent upon the engine speed.

Third, in practice such adjustment of my novel pumping means to vary the velocity factor, is not fixed as above mentioned, but preferably is varied in accordance with changes in engine speed and in an inverse ratio, whereby the absolute rate of injection, or of spray nozzle velocity, may be of any desirable magnitude (constant or otherwise) irrespective of the rate of such engine speed. Thus, generally speaking, as the engine speed and therefore the absolute rate of delivery (unless changed) increases progressively in accordance with some definite velocity factor adjustment of the pump, the said pumping adjustment is progressively changed to secure counteracting lessening of the velocity factor. That is to say, a relatively large velocity factor of the pump is associated with operation of the engine at low or reduced speed, and vice versa.

In Fig. 10 the range of injecting operations or actions for the illustrative case of an engine, such as a direct connected and reversible marine engine, which operates over different ranges of speed and of power output, is substantially included by that part of the pump's fuel delivering action which falls within the outline SQGTWS. Thus, point S denotes the stop condition because coincidence of the previously mentioned instants of injection commencement Q and of injection termination W at said point S indicates that there is no fuel delivery to the spray nozzles.

The part $a'$, shown in heavier dotted line than the remainder of curve $21a'$, indicates the velocity factor, or the relative rate of fuel injection with respect to the speed of the engine, for starting conditions. That is to say, when the engine is started up from a standstill by means of compressed air it is usually turned over at comparatively reduced speed and this necessitates adjustment of the pump to produce a high velocity factor. This action is necessary in order to secure sufficient rate of spray nozzle velocity to insure adequate atomization of the fuel at such low starting speed as previously mentioned.

Furthermore, assuming that the engine is not to be speeded up immediately but is to operate at, say, dead slow speed, the corresponding period of injection denoted by $a'$ is relatively small, as compared to the period Q—W for operation at higher speed and developing more power. This is because of the fact that the size of the fuel charge injected is not only small when running at such reduced speed and therefore low load factor, but also because of the fact that the rate of injection is undiminished by such low speed due to the said high velocity factor associated with my novel fuel supplying device.

Similarly, the heavier part $f'$ of curve $21f'$ indicates a relatively much extended period of fuel injection for full load operation at full running speed. For purposes of illustration it will be assumed that the absolute rate of spray nozzle velocity is desired to be substantially constant for all running conditions, and that this condition has been accomplished for starting and for full running speeds by the velocity factors $a'$ and $f'$ respectively. Then, corresponding velocity factors and periods of injection for running speeds and load factors intermediate starting and full load conditions are indicated by curves intermediate $21a'$ and $21f'$, such as curves $21b'$, $21d'$ or other like curves not shown therebetween.

It should be understood that operation of an engine over a wide range of speeds makes it extremely advisable, if not absolutely necessary, to provide means whereby the timing of injection commencement may be varied to so achieve such changes in speed. Earlier admission of the fuel is required for full running speed conditions than for slow running speed conditions, and vice versa. In Fig. 10, this effect of speed upon variation in injection commencement is substantially indicated by the line SQG which slopes away from and to the left (direction of earlier commencement) of the power piston's top dead center position in the downward direction of the higher speed velocity factors.

Furthermore, such timing of injection commencement is further greatly influenced by the characteristics of the fuel being used by the engine, to require adjustment of such timing which will also satisfy conditions incident to variation of such characteristics. Thus, fuels low in volatile content call for earlier timing of admission than do fuels which have relatively high content of the more volatile matter. Such desirable variation of timing is secured by my novel fuel supplying means as indicated by the series of dotted lines SQG as previously mentioned.

Accordingly, it should be understood, that for any particular speed of engine operation, the timing of injection of commencement secured by such supplying means is chosen at will to secure the utmost injecting and combustion efficiency with the particular grade of fuel then being used. In a similar manner the rate of spray nozzle velocity, as determined by variation of the velocity factor for any particular speed of engine operation, which can thus be secured by means of my novel construction, is chosen at will to best secure the utmost injecting and combustion efficiency with the fuel then being used.

Also, it should be understood that desirable variation in the speed of a variable speed engine is secured by varying the timing of injection termination, as will be hereinafter described. In a similar manner, the load factor of a constant speed engine, such for example as an engine for generation of electrical power, is changed to suit changes in loading by varying the timing of injection termination. Such variation in timing of injection termination can be secured without affecting either the timing of injection commencement or the rate of injection. Preferably, such change in the timing of injection termination is accomplished by changing the instant in which the fuel pump bypass valve E (Figs. 1, 7, 8, 9 and 11) is initially lifted off its seat 17 into its open position, as shown in Fig. 11. In Fig. 11 however, the valve E is shown in its wide open position, but it should be understood that the construction of my novel injecting means is such that injection is terminated almost on the instant that said valve E initially lifts from its seat 17, as will be hereinafter described.

The manner in which engine reversing operations are carried out with my fuel injecting system will now be described. Referring to Fig. 10, it should be noted that the aforementioned region of injecting action shown by SGT pertains only to operation of the engine in the ahead direction, as indicated by the arrow directly above SGT in Fig. 10 and by arrow 71 in Figs. 1, 5, and 6. Also, it should be understood that the direction of rotation of the injection pump drive shaft 161 in Fig. 3, and therefore, of shafts A and B is reversed by and upon reversal of the engine or driving member thereof.

Suitable intermediate clutch or gearlike reversing means (not shown in the drawings) might be employed whereby the driven injecting pump would then operate with correct pumping and timing characteristics irrespective of which direction the engine operated in. However, such reversing mechanism involves sufficient objectionable characteristics to encourage provision of means whereby such reversing operations may be effected in a more desirable manner.

According to the present invention therefore, the engine driven injecting pump directly conforms to all conditions of operation of the driving member 161; the pump speed varies directly with that of the engine; the direction of pump rotation is reversed by and upon the reversal of said engine; and, the timing of operation of the previously mentioned unchangeably acting crankshaft A is always fixed as regards angular readjustment of shaft A with respect to the driving member 161.

Referring again to Fig. 10 it will be noted that a (lagging, for ahead rotation) region JUP, which has substantially similar characteristics to the previously mentioned injecting (for ahead rotation) region SGT, occurs substantially 180-crank degrees away from SGT as indicated by R (see also Fig. 9). Also, as shown, region JUP occurs below the line X—X and is therefore a region of eduction instead of injection. However, immediately upon starting the engine in the reversed direction (by compressed air), such region of eduction JUP, (for ahead rotation as indicated by arrow 23) and designated by line FH, becomes a region of injection (for astern rotation as indicated by arrow 24) designated by VZ but otherwise having similar characteristics to JUP and SGT.

However, the suitable injecting region for astern rotation as indicated by V—Z is separated from, or out of phase with, the injecting region Q—W (or SGT), which is employed for rotation in the ahead direction, by an angular interval R or substantially 180-crank degrees. Thus, while said injecting region Q—W is angularly coincident with the top dead center and injecting positions of its respective power cylinder, said injecting period V—Z for astern rotation is located 180-crank degrees away from such firing point of the same particular cylinder.

According to the present invention novel means are provided to circumvent such objectionable reversing conditions. And preferably this is accomplished by valving means which will achieve proper interchangement of respective injecting pumps and of respective power cylinders whereby the previously mentioned phase difference R between ahead and astern injecting regions Q—W and V—Z may be satisfactorily bridged. Such valving or distributing means must provide features of reliability against failure to act properly and against possibility of misdirection of untimed fuel charges.

It should be understood that such a reversing mechanism is based on the fact, that, in multiple cylinder engines operating on the two-stroke cycle, such engines having two, four, six or eight single acting cylinders have one or more pairs of cylinders, each having two cylinders the firing points of which are separated by 180-crank degrees. Thus, such a system of reversing would not be readily adapted to one and three cylinder single acting engines operating on either the two-stroke or the four-stroke cycle. Nor would it be readily adapted to single acting engines of the four-stroke cycle type which have six cylinder. In double acting engines, which operate on the two-stroke cycle, reversal would be accomplished by interchanging the injection pump ordinarily used (for ahead rotation) to inject fuel into the head end of the cylinder with the injecting pump used for the crank-end of the cylinder.

Referring now to Fig. 11, which illustrates a preferred embodiment of my reversing means, it will be noted that the fuel pumping or supplying and regulating arrangement is substantially similar to the embodiment shown in Fig. 1 and such parts bear the same reference characters. Accordingly, 122 is a plunger which effects a closely fitting sliding connection with a bored out portion of the pump-block 61, and which has an intermediate part 129 of reduced lateral cross-section. Two portlike passages 123 and 124 are located at different and separated points along said boring, and said plunger 122 is adapted to cover or uncover either one or the other of said ports as may be desired. However, plunger 122 is further adapted to uncover but one and only one of said ports, regardless of which one it is, to action of fuel delivery from the pump. Also, it will be understood that possibility of fuel leaking by such closely fitting plunger and boring is so remote as to be negligible, or at least, no more serious than fuel leakage past plungers C and D. It is pointed out here that, since the pressure action by the pump to effect injection occurs intermittently and then only for a small period as previously mentioned, the tendency for any leakage to occur at any of the various connecting joints in my injecting system is almost negligible if any.

Thus, with plunger 122 in the righthand position indicated by solid lines, fuel will be delivered from passage 22 to the fuel line 29, which leads to the automatically acting injection valve mounted on the cylinder head or other suitable regions as shown in Fig. 13, via the ports 127, the ringlike space 128 included between 129 and 61, the portlike passage 123, and the checkvalve 62 in the order mentioned. Such delivery of fuel is secured from any suitable source, but preferably, it is secured from my novel pumping arrangement, whereby the plungers C and D interact to give desirable variable rates of delivery as previously mentioned. And, such delivery of fuel occurs during that part of the displacing action of the pump in which the bypass valve E is closed on its seat 17, as will be hereinafter described. It will be assumed that fuel is delivered by the pump to the injecting valve supplied by port 123 and its supply pipe 29 for rotation of the engine in the ahead direction.

Then for reversed rotation astern, plunger 122 is moved over into the dotted line position at the left by the shifting arm 121 and handlever 119. This action first covers passage 123 isolating it from delivery of fuel from passage 22, and then exposes passage 124 to such delivery from 22. While it should be understood that the reversing lever 119 would be suitably interlocked with the other controls (95 and 96 shown in Fig. 1) (such interlocking arrangement not being shown in the drawings) to prevent reversing shift of plunger 122 during pumping action of plungers C and D, it will be seen that the relief valve 126 protects the pump against damage in the event that pumping action occurs at a time when both of the ports 123 and 124 are blanked off by plunger 122. Accordingly, if a four cylinder single acting two-cycle engine is taken as an example, and the firing order of such an engine is 1—3—2—4, and for ahead rotation plungers C and D constitute the pump for say #3 cylinder supplying the fuel thereto through pipe 29, then for reversed rotation astern the same #3 pump would supply fuel to #4 cylinder through pipe 125. In like manner, #4 pump would supply #3 cylinder through pipe 29, or rather, a branch of pipe 29 which is connected to pumping passages of #4 pump just as the branch 125 is connected to pump #3 in Fig. 11. That is to say, the respective supply lines 29 and 125 are each connected to an injecting valve at one of their ends as shown in Fig. 12, and have Y branches at the other ends, each arm of said Y not only being connected to pumps which are respectively out of phase by 180-crank degrees, but also having a non-return valve such as indicated by 62 and 268 in Fig. 11.

Thus, referring to Fig. 11, the non-return valves 62 and 268 perform two functions: during operation of the engine in the ahead direction when fuel is being supplied through passage 123, the valve 62 acts to prevent emptying of pipe 29 in the interval between successive injecting actions due to educting action of plungers C and D; during such ahead operation valve 268 is tightly closed by the pressure action in pipe 125 during the injecting action of the above assumed #4 pump, and thus serves to relieve the reversing plunger 122 of the need to stop off such branch 125. Such respective functions of valves 62 and 268 are interchanged for astern operation.

Referring now to Fig. 12 it will be seen that my novel injecting means comprises an inwardly opening non-return valve 134 of the so-called needle type, which is tightly held against its seat 92 by the downward compressive effect of spring 91. The stem 148 of said valve 134 slides inside of the sleevelike adjusting member 101 with a closely machined fit. In a similar manner the outside portion of said sleeve member 101 effects a closely machined sliding fit with a bored out portion of the valve body 98. Sleeve member 101 has a threaded screw connection with said valve body 98 in any suitable location, though preferably this is as near the valve seat as permissible, or, as shown by 132. With this construction change in operating clearance effects due to changes in temperature of the valve parts is greatly lessened.

Upon and by initial injecting action of the previously mentioned fuel supplying means fuel thereby supplied via pipe 29 and passage 136 acts as a pressure medium to exert an upward and opening force on said valve member 134. That is to say, such pressure medium acts initially upward on an exposed area of said valve 134 which is substantially equivalent to the lateral area of stem 148 less the area of a circle the diameter of which is substantially the mean diameter of the valve seat 92. With the valve 134 once off its seat it is held open due to such pressure action acting against 134 in an upward direction upon an effective section equivalent in area to the lateral area of stem 148.

It should be understood that considerable pressure is required to force the charge of fuel through the spray nozzles 93 in the short period of time available. In other words pipe 29, passage 136, and the space just adjacent to the spray nozzles 93 are under relatively high pressure action by the fuel during the period of injection, and it is this pressure which acts to maintain the valve member 134 unseated during injection.

In operation the sleeve member is adjusted by means of lever 99 and is screwed down towards the seat 92 so that the resultant clearance 131 between the valve member 134 in its closed position and the annular portion 133 of said sleeve member 101 is comparatively small in extent. Accordingly the lift of valve 134 is restricted to an extremely small extent of travel as indicated by clearance 131 and as determined by the adjusting sleeve member 101 against which it abuts when lifted from its seat during injection.

I will now describe the operating arrangement of my novel fuel injecting and regulating mechanism, reference being made to Figs. 1, 4, 5 and 6. Fuel is supplied to the pump through passage 44 under some relatively low pressure head either from a gravity tank or from a low pressure supply pump (not shown in the drawings). During educting or sucking in action of the pump fuel enters passage 22, and other such regions as well, via the winglike passages 97 provided in the suction valve 57. It should be understood that when valve 57 is positively raised from its seat 78 by tappet 53 during any educting action of the pump such sucking in action is unhindered. However, in the event that such positive opening of valve 57 is lacking, as will be hereinafter explained, said valve 57 will open of its own accord under the combined action of pump suction and of the tendency of the confined fuel in passage 44 to open valve 57 at any time that pump passages 22 and the like are not completely filled with fuel.

The fuel delivered by the pump to the spray nozzles 93 of the injecting valve shown in Fig. 12 is discharged past the delivery check valve 62 into the connecting pipe line 29. The check or non-return valve 62 always remains seated in its closed position by action of gravity and of spring 64 except during the period of fuel injection. The spring 91, which holds the valve member 134 in its closed position as shown in Fig. 12, is suitably proportioned so as to always tightly close valve 134 to positively prevent untimed admission of fuel to the cylinder. In other words, no injection of fuel can occur during fuel delivery by the pump except when the bypass valve E is closed. Such closure of the bypass valve E is controlled and governed by positively acting means.

Preferably this is accomplished by two bellcrank like members 46 and 48 which are given oscillating movements about their respective fulcrum points 68 and 69 by any suitable operating connections such as cams, eccentrics, or preferably as shown, by the respective link members 72 and 73.

It is of importance to note two novel provisions: first, said fuel injection regulating instrumentalities 46 and 48 are operated by driving means which always operate with fixed and unchangeable timing with respect to the engine crankshaft, being driven by the unchangeably acting pump crankshaft A; second, the dead center positions of the operating joints 47 and 49 for operation of said instrumentalities 46 and 48 respectively occur approximately 90-crank degrees away from the corresponding dead center points of crank A as regards operation of plunger C. Accordingly, the previously mentioned angular adjustments of shaft B with respect to shaft A to vary the injection rate have no effect upon the injection regulating mechanism.

and therefore, no effect upon respective adjustments governing the timing of the instant of injection commencement, and the timing of injection termination, and vice versa.

Furthermore, it will be noted in Fig. 10 that the range of injecting action, as shown by SGT and as previously described, occurs just a little prior to the time that crank A and plunger C reach their top dead center position. The valving actions by said regulating means must necessarily be effected at such a time, yet such actions are quick, due to their operation by driving means which are substantially 90-degrees out of phase with said plunger C. It should be understood, that rapidity of such valving actions of E are desirable in order to eliminate sluggish admission and cut-off with their resultant undesirable effects of spray nozzle dribble and poor combustion. Such rapidity of injection commencement and of termination is further enhanced by making spring 91 (see Fig. 12) of sturdy construction and by my novel valve construction whereby the lift 131 of valve 134 may be controllably restricted as previously described.

Such rapidity of valving action as is operatively secured from the operating connections 47 and 49 is further enhanced by properly co-ordinating the lengths of links 72 and 73 with the lengths of arms 46 and 48 and also by properly locating the operating joints 47 and 49 with respect to crank center A and wristpin center 75. This may be better understood by referring to Figs. 5 and 6 in which the curves 77 and 76 respectively indicate the nature of illustrative paths taken by the operating joints 49 and 47. Circles on said dotted curves 77 and 76 indicate the successive positions of points 49 and 47 corresponding to positions of crank A at 45-degree intervals about its center and commencing at the bottom dead center position of crank A, indicated by B. D. C. in Figs. 5, 6, 7, 8, 9 and 10. In the various valve diagrams shown in the above mentioned figures the valving and injecting actions are indicated as referring to the corresponding angular position of crank A with respect to the aforesaid bottom dead center position of said crank A. Such angular relation with respect to the B. D. C. of crank A is measured from said B. D. C. in a clockwise direction.

In Fig. 1 the arrangement of the parts is such as to illustrate their relative positions and actions at the instant just prior to commencement of fuel delivery through pipe 29. That is to say, the by-pass valve E is just in the act of tightly closing on its seat 78 due to the downward receding movement of tappet 53. Such downward movement of 53 is caused by similar downward recession of the projections 65 carried by the bellcrank 46 and then engaging the bottom 67 of tappet 53 because of the then counter-clockwise oscillating movement of said bellcrank 46. It will be understood that timing of injection commencement and of injection termination is regulated by regulating the instants of closure and of opening of valve E respectively.

Preferably this is accomplished by mounting the respective fulcrums, or points of oscillation, 68 and 69 on eccentric adjusting means whereby the said points 68 and 69 may be vertically adjusted with respect to the tappet 53—67 and independently of each other.

Accordingly, for operation of the engine in the ahead direction as indicated by arrow 71 in Figs. 1, 5 and 6 the bellcrank member 46 mechanically, and therefore positively, permits closure of the suction valve 57 on its seat 78 and of the bypass valve E on its seat 17 in the consecutive order mentioned. In other words, after valve 57 is seated the tappet must recede an amount indicated by lift 39 in Fig. 1 before the bypass valve E seats. During the interval in which such recession takes place the pump is delivering fuel, but due to the strong spring 91 which seats the injection valve 134 (Fig. 12) no injection takes place and the fuel is forced to escape through said closing bypass valve E via the winglike passages 97 and small drilled passages 56 in valve 57. With this novel construction whereby the pressure is raised on the fuel entrapped within the pump passages, but to a low extent insufficient to effect injection prior to tight closure of the bypass valve E, all of said passages are completely filled with fuel and any air pockets therein are dispelled. Such action is desirable in order to further eliminate possibility of sluggish injection taking place as previously mentioned.

For any given position of crank A the timing of such closure of the bypass valve E by bellcrank 46 is varied by the handlever 96, which acts to adjust the vertical position of the fulcrum point 68 through a range illustratively indicated by 41 in Figs. 1 and 6, and which itself accomplishes such vertical adjustment by variation of its angular position through the arc 317.

In a similar manner the handlever 95, by change in its angular position through the arc 319, varies the position of the oscillating point 69 of bellcrank 48 through the vertical range indicated by 38 in Figs. 1 and 5 to secure any desired timing of the instant of injection termination for operation of the engine in the ahead direction. In practice, such movement of the lever 95 would be accomplished manually in the case of a marine engine or during starting operations, but would also be accomplished by any suitable automatic governing devices (not shown in the drawings) when running at service speeds. That is to say, regulation of the power output and of the speed is accomplished by such angular changes in the position of the eccentric fulcrum control lever.

The action of my novel injection regulating means may be better understood by referring to Figs. 6 and 7 which illustrate the action of the projection 65 upon the tappet member 53—67 if it were acting alone, and also to Figs. 5 and 8 which similarly illustrate the action of projection 66 upon the valve tappet 53—67 if it were acting alone and independent of said projection 65. The radial valve diagrams shown in Figs. 5 and 6 indicate the instants of action of said respective projections upon the tappet member 53—67 together with the instantaneous direction of oscillating movement of their respective bellcranks 48 and 46. The radially inner sectioned portions 705 in Figs. 5 and 6 indicate that bypass valve E is then open on account of that respective valving member. Similarly the radially outer sectioned portions on each arrow indicate that valve E is then in the closed position as far as that particular valving member is concerned.

The individual valving actions shown in Figs. 5 and 6 are shown in Figs. 8 and 7 respectively in the form of developements plotted to rectangular co-ordinates. The resultant or combined effects which are secured by such novel interaction of the oscillating projections upon said valve tappet member are shown illustratively in Fig. 9. Fig. 9 shows a diagram of injection regulating actions corresponding to the injection period Q—W shown in Fig. 10 for operation of the engine in the ahead direction, as indicated by arrow 71. The corresponding points of the said valve diagram and of the pump characteristic curves bear the same reference characters.

The parts of Fig. 9 shown in heavy solid outline indicate effects which accompany operation of the engine in the ahead direction. Effects which occur when the engine is reversed to operate in the astern direction are indicated by the heavy dotted lines, and notably by the reference characters V, Y, and Z.

Referring to Fig. 9 it will be noticed that two periods of closure of bypass valve E are shown, namely by the closely ruled regions Q—W and O—I. Injection takes place with any desirable variation of either the instant of commencement, or, of the instant of termination as shown by Q—W. The other period of valve E closure as indicated by the closely ruled section O—I varies in extent and in timing according to whatever adjustments are made to vary said injection period Q—W. While, section O—I indicates that valve E is closed by action of the regulating mechanism, such valve E is in reality open, since period O—I occurs within a greater period of educting or sucking in action by the pump as shown by K in Figs. 9 and 10.

In connection with said period of valve E closure, it should be understood that such a period of educting action for ahead operation of the engine becomes automatically a period of fuel delivery and injection when the engine is operated in the astern direction (controls 95 and 96 remaining untouched). Furthermore, a valve E opening action such as caused by member 46, when operating ahead and as shown by I in Figs. 6 and 7, automatically becomes a similarly timed valve E closing action, since reversal of the engine reverses the rotation of crank A. Such reversal of crank A automatically reverses the instantaneous direction of oscillatory movement of said bellcrank members 48 and 46. In a similar manner the valve closing action indicated by O in Figs. 5, 8 and 9 and caused by bellcrank 48 becomes a similarly timed valve E opening action when going astern.

Accordingly, the previously mentioned phase interval R of 180-crank degrees which must be spanned when reversing the engine, is so spanned by the valve regulating means, by merely changing the timing of said valving actions O and I to properly conform to the new direction of rotation. Thus, timing of valve action I shown in Figs. 6, 7 and 9 is changed according to arc 719 to occur at V by adjusting the lever 96 through the arc 317 to move fulcrum 68 vertically through the range 41. And in a similar manner the timing of valve action O shown in Figs. 5, 8 and 9 is shifted as indicated by arc 718 to occur at Z, by vertical movement of fulcrum point 69 through range 38 in accordance with angular adjustment of the lever 95 through arc 319.

Thus, it will be noted that bellcrank member 46 regulates the instant or timing of injection commencement, and bellcrank member 48 regulates the timing of injection termination when the engine is operated in the ahead direction. Such respective opening and closing actions on bypass valve E are, however, interchanged when the engine is operated in the astern direction. It will also be noted that the control levers 95 and 96 operate through respectively different and non-overlapping regions for ahead and for astern operation, and that such controls are therefore adapted to be interlocked with each other and with the previously mentioned reversing lever 119 (Fig. 11) to positively prevent misadjustment of any of said controls. Such interlocking means are not indicated in the drawings as they are not pertinent to novelty in themselves.

I provide novel means whereby my fuel injection regulating mechanism may be relieved from excessive working stresses without impairing operation of the pumping means. It is desirable that the suction valve of such a pump be of ample dimensions to prevent formation of air pockets in the pump passages, and it will be noted that the suction valve 57 is of such size. However, it should be understood that to terminate the period of injection by opening a valve of such size against the injecting pressure then existent would impose undue stress upon tappet 53—67, bellcrank 48, etc. Such conditions are eliminated by means of the previously opening valve E, known as the bypass valve, which is of relatively small size compared to valve 57 and is thereby opened without such attendant stress.

It should be understood that I do not wish to confine embodiment of my novel injection regulating mechanism to operation with a single valve as shown in Figs. 1 and 11, although for simplicity of construction and of operation, I prefer to employ such single valve and such dual interacting regulating members in the manner shown more clearly in Fig. 4. Also, instead of employing the links 72 and 73 cams and rollers on the ends of members 46 and 48 might be employed.

In connection with the driven fuel pumping plungers C and D, which employ no packing substance to prevent leakage past their sliding joint with the fuel cylinders, but which prevent any such leakage by the closeness of their sliding fit with such cylinders, it is extremely important that means be provided to insure that no great lateral distorting effects are imparted to said plunger. With such class of previous pumping devices means have been provided to eliminate such lateral distorting effects, and such pumps have employed two or more guided crosshead members (though sometimes referred to as tappets) acting in tandem, one taking angularity effects from the driving means and the other, or, others acting to dampen any lateral distorting effects imparted thereto by said first crosshead. With such a construction the pump size along the axis of plunger movement must necessarily be greater than is desirable or even permissible for certain classes of pumps where compactness is essential.

I prefer to employ the construction illustrated in Figs. 1 and 2, where the guided cross head 87 is connected to the thereby driven plunger C by means of the pin member 75 which engages the lateral interior sections of a slotted end portion of said plunger to effect line contact between said pin member and plunger. Such prevention of lateral distortion is further carried out by fixedly securing said pin member to the crosshead, whereby oscillating movement of the pin member, due to bearing friction between it and the connecting rod 31, to cause similar friction between said pin member and plunger is eliminated. It should be noted that, with the type of crosshead shown in Figs. 1 and 2, where the small distance between the opposing guides permits extremely small negligible lateral clearance to exist between said crosshead and guides, as contrasted with the barrel guide form of crosshead employed with such class of previous pumps, the lateral misalignment and distorting effects are substantially eliminated. In certain classes of engines I prefer to further reduce possibility of imparting lateral forces to the aforesaid plunger member by employing a roller or ball-bearing means intermediate the aforesaid pin member and slotted plunger portion. (Not shown in the drawings.)

Damage of any great extent to the pumping parts in the event of plunger C sticking fast in its cylinder for any reason or other, is prevented by the novel plunger construction shown in Figs. 1 and 2. I prefer to reduce the section of the lower part 782 of the slotted portion of said plunger in any suitable manner such as illustrated, whereby such section is adapted to break upon any tendency of the plunger to stick fast in its cylinder, such breakage to occur on a down stroke of the driving crosshead whereby such protection is afforded without in any way weakening the pumping parts as regards fuel delivering stress action thereon. It should be understood of course that such a weakened section 782 may be in the form of a separable part joined to the plunger part by any suitable means such as bolts. It should also be understood that the pin member 75, shown in Figs. 1 and 2 as being carried fixedly by the crosshead member and as being adapted to limited lateral movement with respect to the plunger, can secure such effects with the aforesaid characteristics respectively interchanged.

It should be understood that I do not imply confinement of my invention to the specific embodiments illustrated in the drawings. For example, instead of the two plungers C and D preferably having one valving and controlling device common to them both, said respective plungers might have separate individual valving and controlling means to act as individual pump units, which would be capable of adjustment of phase of drive therebetween, and which would act to deliver fuel to a common injection supply passage in a simultaneous manner.

Certain features of the present application are shown, described and claimed in my copending applications. Serial Nos. 265,092, 265,093, 265,094, 265,095, filed March 27, 1928, respectively.

What I claim is:

A fuel supplying and regulating means for a Diesel engine fuel injection system comprising a pair of fuel pumping plungers, and means for varying the cyclic phase of action of said plungers relatively to each other for affording variable rates of fuel delivery during a certain cyclic period, means for effecting injection of the fuel during portions of said cyclic period, and means for selecting the portion of the cycle for such delivery.

In testimony whereof I hereto affix my signature.

JOSEPH C. GROFF.